United States Patent
Gansen et al.

(12) 
(10) Patent No.: US 7,576,137 B2
(45) Date of Patent: Aug. 18, 2009

(54) MOLDING MADE FROM POLYURENTHANE

(75) Inventors: Peter Gansen, Seeburg (DE); Massimo Losio, Monaco (MC)

(73) Assignee: Technogel GmbH & Co. KG, Duderstadt (DE)

( * ) Notice: Subject to any disclaimer, the term of this patent is extended or adjusted under 35 U.S.C. 154(b) by 624 days.

(21) Appl. No.: 09/726,075

(22) Filed: Nov. 29, 2000

(65) Prior Publication Data

US 2001/0018466 A1 Aug. 30, 2001

(30) Foreign Application Priority Data

Nov. 29, 1999 (DE) ................................ 199 57 397

(51) Int. Cl.
*C08G 18/28* (2006.01)
(52) U.S. Cl. ........................ 521/170; 521/172; 521/173; 521/174; 428/318.6; 428/423.1; 428/423.3; 428/423.4
(58) Field of Classification Search .............. 428/423.1, 428/423.3, 423.4, 318.6; 521/170, 172, 173, 521/174
See application file for complete search history.

(56) References Cited

U.S. PATENT DOCUMENTS

| 4,456,642 | A | * | 6/1984 | Burgdorfer et al. | ............ 428/68 |
| 5,543,225 | A | * | 8/1996 | Mueller et al. | ........... 428/423.1 |
| 5,747,167 | A | * | 5/1998 | Greene | .................... 428/423.1 |
| 5,844,013 | A | * | 12/1998 | Kenndoff et al. | ............. 521/137 |
| 6,013,210 | A | * | 1/2000 | Gardner, Jr. | ................. 264/40.1 |
| 6,294,248 | B1 | * | 9/2001 | Madan et al. | ............ 428/318.6 |
| 6,479,561 | B1 | * | 11/2002 | Zhou et al. | ................... 521/155 |

FOREIGN PATENT DOCUMENTS

| AU | 199929072 B2 | 11/1999 |
| EP | 0 057 838 | 3/1985 |
| EP | 0 511 570 | 11/1992 |
| JP | 02187507 | 9/2002 |

\* cited by examiner

*Primary Examiner*—John Cooney
(74) *Attorney, Agent, or Firm*—Whitham Curtis Christofferson & Cook, P.C.

(57) ABSTRACT

A polyurethane molding is composed of at least two different polyurethane materials, namely of a polyurethane gel and a polyurethane foam. The foam and the gel are arranged in layers one above another so that both materials act together as spring or damping element with respect to a load in the transverse direction. These moldings may preferably be used as seat cushions.

5 Claims, No Drawings

MOLDING MADE FROM POLYURENTHANE

CROSS REFERENCE TO RELATED APPLICATIONS

This application claims priority to German application DE 199 57 397.2 filed Nov. 29, 1999.

BACKGROUND OF THE INVENTION

The present invention relates generally relates to a molding made from polyurethane, and more particularly, to a seat cushion and a process for its production. The process for producing the molding comprises several alternatives within the framework of a mold casting process.

Polyurethanes are used in different morphologies and in a variety of different areas of application. For example, the use of polyurethane foam is known for upholstering furniture parts, seats, in particular car seats, and for seat cushions. This material is generally employed as a molding or is cut from blocks when it is used in the seat field.

In the automobile field for example, currently more than 80% of all cars are fitted with seat cushions made from polyurethane foam. However, the comfort of these seat cushions is sometimes considered a drawback.

Gels made from polyurethane are also known for use as seat cushions.

Patent EP 57838 claims gels for avoiding decubitus, which is characterized by so-called undercrosslinking. These gels are produced by the reaction of a polyisocyanate with long-chain polyols. These dimensionally stable gels made from polyurethane raw materials may be used as mattresses, mattress inserts, automobile seats and upholstered furniture.

Patent EP 511570 protects improved gels made from polyols and polyisocyanates having low characteristic, which are produced from mixtures of long-chain and short-chain polyethers. Cushions in shoes, on bicycle saddles and on seat surfaces, supports to avoid and prevent injuries, face masks and upholstery under riding saddles are possible applications for the improved gels of Patent EP 511570.

The high weight and the high thermal capacity of seat cushions made from pure gel are disadvantageous. The high thermal capacity may lead to cold seats since body warmth is removed perceptibly to heat a cushion made from gel.

The present invention is directed to overcoming one or more of the problems set forth above.

SUMMARY OF THE INVENTION

In one aspect of the present invention, a molding that includes polyurethane, is disclosed. This molding includes at least one polyurethane gel, and at least one polyurethane foam wherein the at least one polyurethane gel and the at least one polyurethane foam are joined by implicit adhesive properties during production of the molding.

In another aspect of the present invention, a mold casting process for producing a molding that includes polyurethane is disclosed. This method includes the steps of producing a reaction mixture of polyurethane gel composition and a foamable polyurethane, and joining, during foaming and curing, the reaction mixture of the polyurethane gel composition and the foamable polyurethane.

Still another aspect of the present invention is to overcome the aforementioned disadvantages in the state of the art and to combine particularly good spring and damping properties of the molding in the load direction with characteristics providing improved seat comfort. To achieve this aspect, the invention provides a molding made from polyurethane which is composed of at least two different polyurethane materials, namely at least one polyurethane gel and at least one polyurethane foam, which are arranged in at least two different spatial regions of the molding. The polyurethane gel and polyurethane foam are joined by their implicit adhesive properties during production of the urethane.

The molding may be produced in a mold casting process using a conventional mold, as is also used in the production of foam. The composite material brought together within the molding according to the invention optimally joins the spring or damping properties of the individual materials, resulting in a considerable advance in seat comfort. Alternate arrangements, such as multi-layered arrangements of the different materials, are possible. Also different arrangements with respect to the spatial organization of the materials are possible, such as where one material is arranged only in the region of the seat panel. The different arrangements may advantageously be selected and used depending on the required properties.

The molding preferably comprises an outer covering layer which is impermeable particularly to the polyurethane gel.

The covering layer may consist of a film, in particular a polyurethane film, a polyvinyl chloride film or leather or a textile material, such as a microfiber material. In principle, various flexible materials are suitable as film material for the present invention.

These are merely illustrative aspects of the invention, however, there are numerous other aspects to this invention and the above listing should not be construed as all encompassing.

DETAILED DESCRIPTION

In a preferred embodiment of the invention, the polyurethane foam and the polyurethane gel are arranged in at least two layers, one above another, so that the foam and gel layered one above the other act as spring or damping element with respect to a load which applies force in the transverse direction.

In a preferred embodiment, a gel layer may be surrounded at least partly by foam or alternatively a foam block may be surrounded at least partly by a gel.

In yet another embodiment of the invention, the molding is designed as a seat cushion, wherein a textile cover layer is preferably on at least the side and on the seat panel side. This applies particularly when a film has been used during rear-foaming, where the cushion is conventionally covered later.

If textiles are used externally in this embodiment of the invention, they should be sealed vacuum-tight towards the gel side. The use of a textile cover material directly as a covering layer is therefore not possible for simple, coarser textiles, since penetration of the still liquid gel material into the textile should be prevented. Films made from thermoplastic polyurethane or closed-cell, cut polyurethane foam, for example, may be used for depositing a textile covering material.

The conventional polyols and polyisocyanates are reacted with one another to produce the polyurethane foam. The processing technology and typical raw materials can be found in references such as the "Polyurethane Handbook", published by G. Oertel.

Raw materials, as described in European patents EP 57838 to which U.S. Pat. No. 4,456,642 Burdörfer et al. is a member of the same patent family/a parallel application and EP 511570 to which U.S. Pat. No. 5,362,834 Schäpel et al. is a member of the same patent family/a parallel application, both of which are hereby incorporated by reference are used for producing the gels.

The process for producing a polyurethane molding according to the invention is characterized in that a molding is made from a polyurethane gel composition and a foamable polyurethane reaction mixture is produced, wherein the two compositions are joined to one another during foaming and curing.

The fact that the sandwich construction of two different polyurethane compositions utilizes the adhesive properties of this material in an optimum manner, has a particularly advantageous effect on the molding produced.

The materials are preferably cast onto a covering layer, which is laid in the mold die or is placed on the final bond material.

If required, the moldings produced may then also be covered with additional material.

In one embodiment, the process may be carried out so that a freshly produced gel composition mixture of polyol and polyisocyanate is introduced into a mold lined with a covering layer. A polyurethane raw material mixture is then applied to the gel layer for the production of foam. Thereafter, the conditions for foaming and curing of the compositions are maintained in the mold.

According to a further embodiment of the process, a pre-formed gel layer may be introduced into the mold preferably lined with a covering layer, after which a polyurethane raw material mixture is applied for the production of foam. Conditions for foaming and curing of the molding are maintained in a conventional manner—that is by utilizing a certain residence time with a certain temperature profile.

The pre-formed gel layer may be placed on the mold base or attached to the mold lid.

In a further alternative embodiment, a pre-formed foam block may also be placed in the mold, after which the mold is filled with a gel composition, while the reaction conditions for producing the polyurethane gel from the gel composition are maintained.

The polyurethane gel is preferably produced from raw materials where the product of the isocyanate functionality and the functionality of the polyol component is at least 5.2, but preferably at least 6.5 or 7.5.

In preferred embodiments of the present invention, the polyol component for producing the gel includes a mixture of one or more first polyols having hydroxyl numbers below 112, and one or more second polyols having hydroxyl numbers in the range 112 to 600, wherein the weight ratio of the first polyols to the second polyols lies between 90:10 and 10:90, the isocyanate characteristic of the reaction mixture lies in the range from 15 to 59.81, and the product of isocyanate functionality and functionality of the polyol component is at least 6.15.

In a further specific exemplary embodiment, the raw materials for producing the gel includes one or more polyisocyanates, and a polyol component consisting of first component of one or more polyols having hydroxyl numbers below 112, and a second component of one or more polyols having hydroxyl numbers in the range 112 to 600, and optionally a catalyst for the reaction between isocyanate and hydroxyl groups, and optional fillers and/or additives which are known from polyurethane chemistry, wherein the weight ratio of first component to the second component lies between 90:10 and 10:90, the isocyanate characteristic of the reaction mixture lies in the range from 15 to 59.81, and the product of isocyanate functionality and functionality of the polyol component is at least 6.15.

The polyol component for producing the gel preferably consists of one or more polyols having a molecular weight between 1,000 and 12,000 and an OH number between 20 and 112, wherein the product of the functionalities of the polyurethane-forming components is at least 5.2, and the isocyanate characteristic lies between 15 and 60.

As isocyanates for gel production, those of the formula $Q(NCO)_n$ may preferably be used, wherein n represents 2 to 4 and Q denotes an aliphatic hydrocarbon radical having 6 to 18 C atoms, a cycloaliphatic hydrocarbon radical having 4 to 15 C atoms, an aromatic hydrocarbon radical having 8 to 15 C atoms. The isocyanates may be used in pure form or in the form of the conventional isocyanate modifications, such as urethanisation, allophantisation or biuretisation.

The invention is described in more detail below using exemplary embodiments, which should better explain the possible embodiments.

In one embodiment of the invention, a film or a textile which is provided with a vacuum-tight film, is deep-drawn in a seat mold. The underside of the mold subsequently represents the seat panel of the cushion. A freshly produced mixture of polyol and polyisocyanate is then introduced in liquid form into this mold. These materials completely or partly cover the seat panel after filling. After this mixture has reacted completely or partly to form a polyurethane gel, a liquid or pre-foamed mixture of polyurethane raw materials is introduced into the mold for the production of mold foam. The mixture foams, the lid of the mold is closed and, after the curing time of conventionally between one to 10 minutes, the complete seat cushion is removed from the mold.

In a further embodiment of the invention, the polyurethane gel is produced separately and placed in the mold as a dimensionally stable gel, either in one piece or in sections. The gel is positioned on the film or on the laminated textile. After foaming in the mold, the gel is fixed at defined points of the seat panel by the polyurethane foam. Hence, the gel may specifically improve the comfort. In this embodiment, it is also possible to position a gel cushion on the mold lid. It is thus situated at the bottom after foaming. The seated feeling in foam can thus advantageously be combined with the pressure-distributing properties of the polyurethane gel.

In a third embodiment of this invention, cut polyurethane foam and gel are joined to one another by the reacting gel. This may be accomplished, by way of example, in that the gel is cast onto a deep-drawn film or a vacuum-tight textile, and then the foam is placed on the incompletely reacted gel. The intimate bond of gel and foam is produced during the completion reaction.

Other objects, features and advantages will be apparent to those skilled in the art. While preferred embodiments of the present invention have been illustrated and described, this has been by way of illustration and the invention should not be limited except as required by the scope of the appended claims.

We claim:

1. A seat cushion, comprising:
   a covering material that is impermeable to polyurethane gel and which is selected from the group consisting of leathers, films, and textiles;
   a multilayered polyurethane molding positioned under the covering material, said multilayered polyurethane molding comprising
   at least one polyurethane gel layer,
   at least one polyurethane foam layer, said at least one polyurethane gel layer and said at least one polyurethane foam layer being different from one another; and
   a bond between said at least one polyurethane gel and said at least one polyurethane foam which is formed only from said at least one polyurethane gel and said at least one polyurethane foam.

2. The seat cushion of claim 1 wherein each of said at least one polyurethane gel and said at least one polyurethane foam are configured as one or more layers.

3. The seat cushion of claim 1 wherein said at least one polyurethane foam is positioned as a layer on top of said at least one polyurethane gel.

4. The seat cushion of claim 1 wherein said at least one polyurethane gel at least partially surrounds said at least one polyurethane foam.

5. The seat cushion of claim 1 wherein said at least one polyurethane foam at least partially surrounds said at least one polyurethane gel.

* * * * *